June 17, 1947.  E. S. CHRISTENSEN  2,422,338
PIPE END FORMING MACHINE
Filed Aug. 4, 1944  3 Sheets-Sheet 1
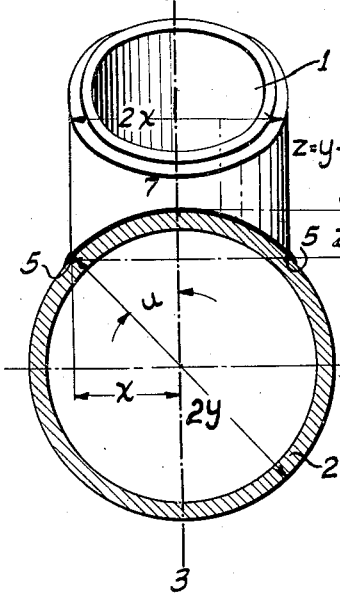
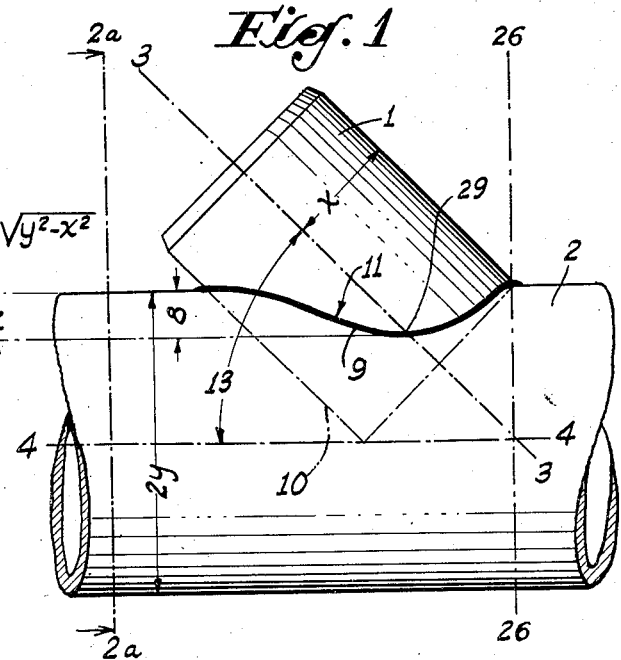
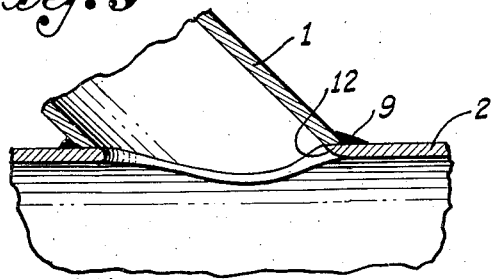
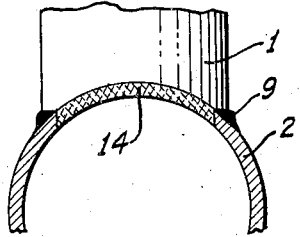
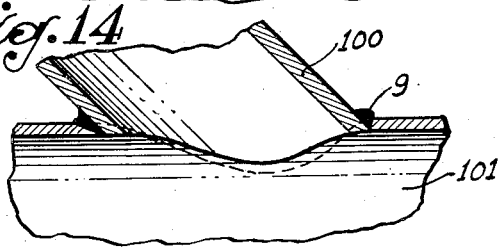
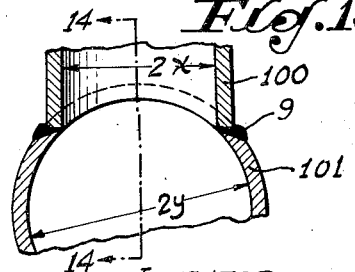
INVENTOR
EDWIN S. CHRISTENSEN
BY HARRIS, KIECH, FOSTER & HARRIS
FOR THE FIRM
ATTORNEYS June 17, 1947.  E. S. CHRISTENSEN  2,422,338
PIPE END FORMING MACHINE
Filed Aug. 4, 1944  3 Sheets-Sheet 2
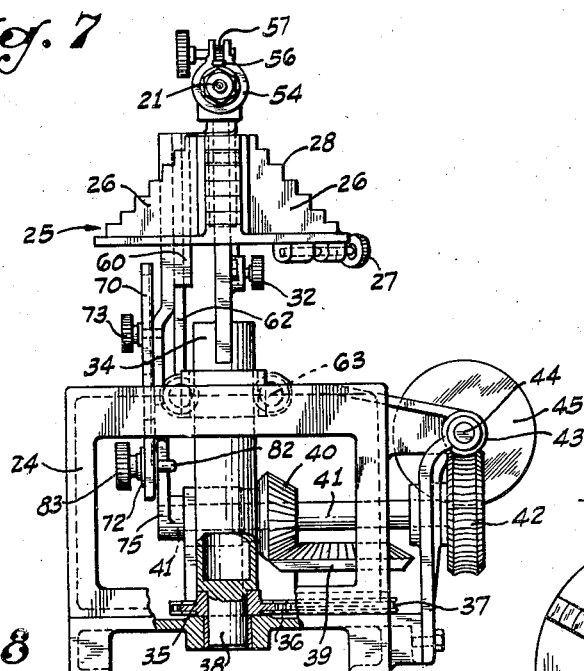
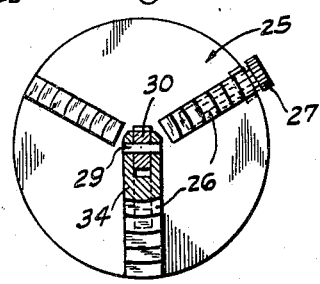
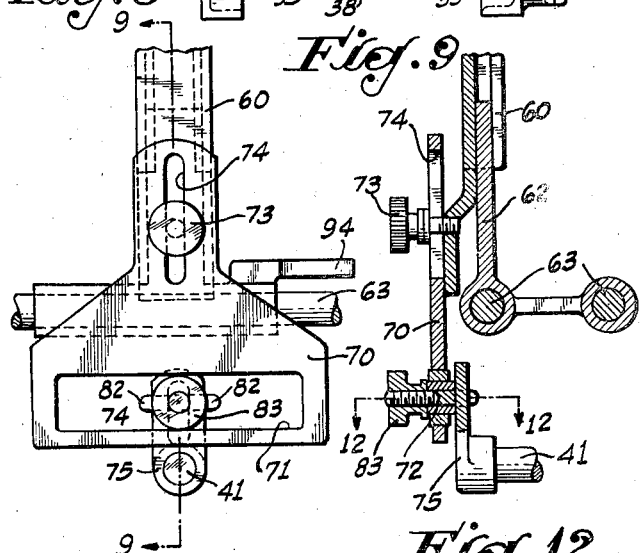
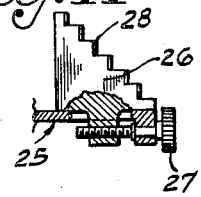
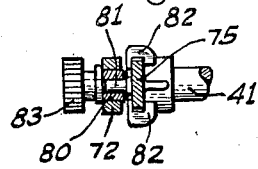
INVENTOR
EDWIN S. CHRISTENSEN
BY
HARRIS, KIECH, FOSTER & HARRIS
FOR THE FIRM
ATTORNEYS

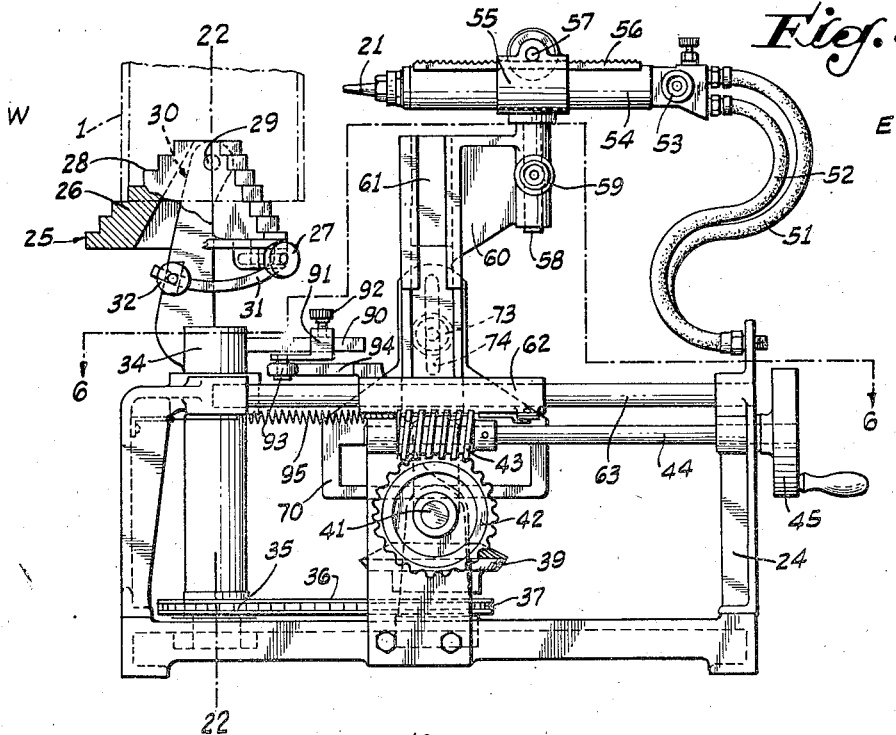

Patented June 17, 1947

2,422,338

UNITED STATES PATENT OFFICE 2,422,338

PIPE END FORMING MACHINE

Edwin S. Christensen, Long Beach, Calif.

Application August 4, 1944, Serial No. 548,022

9 Claims. (Cl. 266—23)

My invention comprises a novel apparatus for cutting, by means of a cutting torch, the end of one steel pipe, herein called the primary pipe or nipple, so that this end will have a surface which coincides with the surface of a secondary pipe to which it is desired to weld the primary pipe. This I accomplish by the use of a cutting jet of high temperature oxidizing gas such as is produced by an oxy-hydrogen or oxy-acetylene torch.

Such torches are now generally used for cutting pipe by marking the end of the pipe by means of template having the desired configuration and using such a torch directed by an operator to cut along the mark so made. It is an object of my invention to provide a machine which will allow the ends of such pipes to be cut without the use of a template. It is not extremely difficult to make such templates for cutting the ends of primary pipes which it is desired to weld to secondary pipes with their axes at right angles, but it is rather hard to develop templates that will allow the primary pipe to be properly marked if the axes of the pipes are not at right angles to each other.

It is a further object of my invention to provide a machine which will properly shape the ends of primary pipes so that they will fit closely on the outer surfaces of secondary pipes when the axes of the pipes are at an acute angle of incidence to each other.

It is a further object of my invention to provide an apparatus to so cut the ends of primary pipes or nipples that they will fit closely on secondary pipes of any larger diameter.

It is a further object of my invention to provide a novel form of nipple so shaped as to be readily welded to a secondary pipe.

Further objects and advantages will be made evident hereinafter.

In the drawings, which embody one form of my invention,

Fig. 1 shows diagrammatically a pipe junction of a nipple produced by my machine with a secondary pipe;

Fig. 2 is a section on a plane identified by the line 2a—2a of Fig. 1 as viewed in the direction of the arrows at the end of said line;

Fig. 3 is a section through the junction on a plane identified by the line 3—3 of Fig. 2;

Fig. 4 is a section on a different scale of the junction on a plane identified by the line 2b—2b of Fig. 1;

Fig. 5 is an elevation looking north of my machine, partly in section;

Fig. 6 is a plan view, partly in section, on a broken plane 6—6 of Fig. 5 as viewed looking down;

Fig. 7 is an end view looking east at the machine shown in Fig. 5, certain parts being shown in section;

Fig. 8 is a detail of certain parts;

Fig. 9 is a section on the line 9—9 of Fig. 8;

Fig. 10 is a plan view of the chuck looking down and is partly in section;

Fig. 11 is an elevation, partly in section, of the clutch jaw and its adjusting screw;

Fig. 12 is a plan view looking down and partly in section on the line 12—12 of Fig. 9;

Fig. 13 is a section through a high pressure pipe joint; and

Fig. 14 is a section on a plane identified by the line 14—14 of Fig. 13.

The principles upon which my invention depends may be better understood from an inspection of Fig. 1, in which 1 is the primary pipe or nipple, the end of which must be cut to fit rather exactly to the outer surface of a secondary pipe 2 so that the pipe 1 can be welded to the pipe 2. Such joints are used not only where the pipes are used to carry fluids, but also where pipes are used as structural members. In the following description the axis 3—3 about which the outer cylindrical surface of the primary pipe is concentric will be referred to as the primary axis. The axis 4—4 of the secondary pipe 2 will be referred to as the secondary axis.

Referring to Fig. 2, it will be seen that the outer surface of the pipe 1 intersects the outer surface of the pipe 2 at points forming a chord 5—5. The distance $z$ is, of course, the versed sine of one-half the angle subtended by the chord 5—5. This distance, hereinafter called the vertical displacement, can be expressed mathematically for all values of the angle of incidence 13 (see Fig. 1) between the axes 3—3 and 4—4 of the pipes. If $2x$ is the diameter of the primary pipe 1 and $2y$ is the diameter of the secondary pipe 2, the vertical displacement $$x = y - \sqrt{y^2 - x^2}$$

Knowing the diameters of the pipes 1 and 2, the vertical displacement $z$ can be readily computed by this formula. For example, if the pipe 1 is six inches in outside diameter and the pipe 2 is eight inches in outside diameter, the vertical displacement is two inches.

The above theoretical discussion assumes that a junction is to be made of the outer surfaces of the pipes 1 and 2. When the pipes are to be united by welding, practical considerations dictate that the junction be made between the inner surface of the smaller pipe and the outer surface of the larger pipe, and $x$ in the above formula becomes the radius or one-half the inner diameter of the smaller or primary pipe 1. If the cut is made, as will hereinafter be explained, following the formula as above amended, the inner edge of the cut which lies in the inside surface of the pipe 1 will fit closely on the outer surface of the pipe 2, as shown in Figs. 3 and 4. A weld 9 is then formed, as shown in black in Figs. 3 and 4 and indicated roughly by the black zone in Fig. 1.

In practice it is not necessary that the ends be cut on long pipes 1, short nipples being used, one end of which is cut to fit the pipe 2 and the other end being in a plane perpendicular to the axis 3—3. If the member of which this nipple 1 is to be a part is to be longer than the nipple, a longer length of pipe is welded on the outer end of the nipple. This is a great convenience, as the pipe 2, which may be twenty feet or more long, has all the necessary nipples formed as to the shape of their ends and welded in place before final assembly of the joint or structure of which they are to be a part, which is accomplished by welding the nipples to longer members forming a continuation of the nipples. This use of nipples is shown in Fig. 1, in which the dotted lines 10 show the original form of the nipple, that is, the pipe 1 before the pipe is cut along the line 11.

If the pipes 1 and 2 are to be used as conductors of fluid, the nipple or pipe 1 is first cut and then held against the outer surface of the pipe 2, thus acting as a template to define the location, size, and shape of a hole 12 through the pipe 2. This hole is produced by scribing the outline of the junction of the inner wall of the nipple or pipe 1 with the outer surface of the pipe 2 and then removing the pipe 1 and cutting out the material 14 shown cross-hatched in Fig. 4, by using a hand operated torch, cutting from the pipe 2 just inside the scribed line the material which is cross-hatched in Fig. 4.

For the purpose of cutting ends on nipples, each of the ends fitting against a certain size of secondary pipe at a certain angle of incidence, I have invented a machine which may be so adjusted that it will cut such ends on a wide variety of sizes of nipples, and so adjusted that it cuts such an end on any size of nipple within its capacity so that the end will fit against any larger secondary pipe at any angle of incidence.

Such a machine is illustrated in Figs. 5 to 12. This machine can, if desired, be used to produce templates which are sheet metal members which can be bent in the form of pipes to slip over the pipe 2 in the field so that the pipe can be scribed along the line 11 of Fig. 2 and thereafter cut along the scribed line in the desired shape. Whenever the word "pipe" is used hereinafter in the specification or claims, it should be understood to include such a template. For convenience in description, the words "up" and "down" as used in the specification and claims refer to the machine as viewed in Fig. 5, and the words "east," "west," "north," and "south" refer to directions that would exist if the observer looking at Fig. 5 were looking toward the north, it being understood that in use the machine may occupy any position in space.

In this machine a cutting torch 21 is so mounted and constrained to move that the cutting jet therefrom is always directed horizontally toward the west and toward an axis 22—22 which is shown for reference purposes in Fig. 5. Mathematical accuracy is not required, and deviation of five degrees in either direction from the horizontal line of the jet is permissible. The torch 21 is, however, so mounted that it can move up or down, or east or west, with the axis of the cutting jet from the torch in a vertical plane containing the axis of rotation 22—22.

The machine is provided with a supporting structure 24, which in the following description is assumed to be stationary. The pipe 1 is secured in a chuck 25 or other convenient means, that shown having three jaws 26 (see Figs. 10 and 11) which are adjusted in and out from a center by screws 27 (see Fig. 11). The jaws are stepped as shown at 28 in Fig. 11 to take different diameters of pipe. The pipe 1 is placed over the jaws 26, which are expanded to engage the inside of the pipe 1 and lock it solidly on the chuck 25. The chuck 25 is mounted on a pin 29, whose position is shown in Fig. 1, carried on a member 30 (see Fig. 7), so that the chuck 25 and pipe 1 may be turned about an axis passing through the center of the pipe 29, the axis 3—3 of the pipe 1 swinging about an angle until the axis 3—3 of the pipe 1 is at an angle with the horizontal equal to the angle of incidence. The chuck is then locked by a screw 32 (see Fig. 5), so that as the chuck 25 is rotated about the rotative axis 22—22, the axis 3—3 of the pipe 1 always intersects the axis 22—22 at an angle to the horizontal equal to the angle of incidence 13.

The member 30 is carried on a vertical primary shaft 34. The shaft 34 carries a sprocket 35 driven by a chain 36 from a sprocket 37 on a third shaft 38 which has a bevel gear 39 driven by a bevel gear 40 carried on a fourth shaft 41. The fourth shaft 41 has a worm gear 42 driven by a worm 43 on a fifth shaft 44 which is driven by a hand operated crank 45. All the sprockets, gears, and the worm above described are solidly secured on their respective shafts, and the shafts are mounted in suitable bearings carried in the supporting structure 24. It will be understood that the gearing consisting of the parts 34 to 44 is merely one convenient means for causing the chuck 25 and the pipe 1 to rotate about the rotative axis 22—22 as the crank 45 is rotated. The operator, commonly called a welder, turns the crank 45 at such a speed that the jet from the torch 21 makes a clean and smooth cut through the pipe.

The torch 21 is a standard cutting torch supplied with the gases necessary to produce a cutting jet, the gases being supplied through flexible hoses 51 and 52 having the usual valves 53. In accordance with standard practice, the torch proper 54 moves horizontally east and west in a sleeve 55, the torch 54 having a rack 56 manually actuated by a gear 57. The torch can thus be adjusted horizontally east or west to put the west end of the torch at the best initial distance from the pipe 1. In use the torch 54 is intially adjusted east or west in the sleeve 55, and the sleeve is then moved automatically east or west to maintain the torch at about the proper distance from the pipe. There is nothing very critical about this distance, the position and extent of the cut not varying appreciably for considerable changes in this distance.

The sleeve 55 is mounted on a vertical pin 58 which projects into a frame 60 which may be adjusted up or down on a vertical guide 61 rigidly fixed on a torch carrier 62. This carrier is free to move horizontally east or west along two guides 63 fixed in the supporting structure 24. The pin 58 is locked by a screw 59 so that the torch can be held in any desired position in a horizontal plane.

A yoke 70 has a horizontal slot 71 therein, this slot being engaged by a roller 72. The yoke 70 has a vertical slot 74 therein. A bolt 73 threaded in the frame 60 allows the yoke to be clamped to the frame at various vertical positions so that the distance between the horizontal cutting axis of the torch 21 and the horizontal axis of the slot 71 may be adjusted at various distances. The roller 72 is carried on a crank pin 81 of a crank 75 which is carried on the shaft 41. The roller 72 is mounted, as shown in Fig. 12, on a sleeve 80 through which the pin 81 passes. One end of the pin 81 is bifurcated, as shown, to form two ends 82 which surround the crank 75. The other end of the pin 81 is threaded to receive a knurled nut 83. When the nut 83 is tightened on the pin 81, it clamps the crank 75 between the bifurcated ends 82 and the sleeve 80 and fixes the position of the axis of the roller 72 at a definite radial distance from the axis of the shaft 41 without interfering with the free rotation of the roller 72.

The gear 40, which is carried on the shaft 41, is one-half the pitch diameter of the gear 39 so that the primary shaft 34 makes only one revolution while the crank 75 makes two revolutions, the sprockets each having the same number of teeth. As the operator turns the crank 45, the chuck, with the pipe set at the desired angle of incidence with the horizontal, turns about the rotative axis 22—22, and the torch moves up and down through a distance equal to twice the radial distance of the center of the crank pin from the center of the shaft 41, the crank pin passing through two complete cycles while the chuck is making one revolution. This radial distance is set to equal one-half the displacement $z$ of Fig. 2. This distance is determined by the relative diameters of the pipes 1 and 2 and is determined by the formula, displacement or twice radial distance $=y-\sqrt{y^2-x^2}$, where $y=$outside diameter of the large pipe 2 and $x=$inside diameter of the nipple 1. The necessary crank settings for all the standard sizes of pipe are embodied in a table fixed to the frame 24.

Rigidly secured to the shaft 34, which in practice may be a hollow tube, is an arm 90, this arm rotating with the shaft 34. Slidable radially on the arm 90 is a roller carrier 91 which may be fixed in any radial position on the arm 90 by a set-screw 92. Carried on a pin projecting downwardly from the roller carrier 91 is a roller 93. The side of the shaft just below the arm 90 has a recess therein so that when the carrier 91 is moved to its extreme westerly position the roller 93 is entirely within the shaft 34. Pressing against the east side of the roller 93 is a cam 94 rigidly fixed on the torch carrier 62. The form of cam shown in Fig. 6 is not mathematically exact, but it serves the purpose, which is to keep the tip of the torch 21 about the same distance from the pipe 1 as the pipe revolves. The arm 90 is positioned at right angles to the axis of the pin 29 and projects to the west when the pipe is so held by the chuck that the upper end thereof points to the west. The cam 94 is held against the roller 93 by a tension spring 95 attached at one end 96 to the structure 24 and at the other end 97 to an extension 98 of the torch carrier 62.

The machine is initially assembled so that the crank pin 81 is at its lowest position when the pin 29 is pointing east and west. During the time that this pin rotates through an angle of 180° about the axis 22—22, the crank makes a complete revolution so that the pin 29 again points east and west when the crank pin 81 is again at its lowest position.

The machine is operated as follows: The displacement is determined by the formula $$z=y-\sqrt{y^2-x^2}$$

where $z$ is twice the radial distance of the pin 81 from the center of the shaft 41, $y$ is the outside diameter of the secondary pipe 2, and $x$ is the inside diameter of the primary pipe 1, and the pin 81 is adjusted on the crank 75 so that this radial distance is one-half of $z$. The mechanism is then operated by the crank 45 so that the crank pin 81 is at its lowest position. The bolt 73 is then loosened, and the torch 21 is moved up or down so that the torch points at the pin 29. Since mathematical nicety is not required, this can be done by visual inspection. The yoke 70 is then clamped to the carrier 60 so that as the crank turns the torch is raised through the distance 8 in one revolution of the crank, or in one-half a revolution of the clutch. The pipe or nipple 1 is then secured on the clutch, and the pipe and clutch are turned about the pin 29 until the outside of the pipe is at an angle to the horizontal equal to the desired angle of incidence 13. This angle may be determined by a protractor or by calibrations on the clutch and its support. The operator, who is presumed to be a skilled welder, then rotates the pipe by means of the crank and sets the position of the roller 93 by loosening the set-screw 92. Every welder knows about how far from the work he desires to hold his torch, and he can adjust the roller 93 at a suitable radial distance to suit himself, or the arm 90 may be calibrated to give the proper position of the roller 93.

The pipe 1 may have a small hole drilled in it to assist in starting the cut, this hole being drilled at any point in the line of cut, and this point may be marked by moving the torch 21 west until the tip of the torch touches the pipe, by using the rack 56 and gear 57. After this hole is drilled, the torch is moved to the east to get the proper distance for cutting, and the torch is ignited and starts to cut. The operator then turns the crank 45, and, as the pipe rotates, the end is cut to the required shape. Although mathematical accuracy is not required, a skilled welder can produce a very smooth and even cut. If the joint is intended to pass fluid to or from the nipple 1 from or to the secondary pipe 2, the nipple is then placed on the pipe in the proper position and used as a template to scribe off the portion 14 of the pipe 2, which is then cut out with a hand torch. The nipple is then replaced in position, and the weld 11 is made. In high pressure work the joint is made as shown in Figs. 13 and 14. The dimension $2x$ is the inside diameter of the primary pipe 100, and the dimension $2y$ is the inside diameter of the secondary pipe 101, and the formula $$z=y-\sqrt{y^2-x^2}$$

uses these inside diameters so that after the end of the pipe 100 is cut in my machine, the curve generated lies in the inside diameter of both pipes. Using the pipe 100 as a template, the pipe 101 is marked and then cut away and welded as shown in Figs. 13 and 14.

I claim as my invention:

1. A machine for cutting an end of a nipple in such a manner that the end so produced will fit closely on the outer surface of a pipe with the axis of the nipple coinciding with the axis of the pipe and at an angle of incidence thereto, which comprises: a supporting structure; a primary shaft so mounted in said structure that it is free to turn about a vertical rotative axis; a chuck so constructed as to hold said nipple firmly with relation to said chuck; means for so mounting said chuck on said primary shaft that the chuck turns with said shaft but can be adjusted and secured in various positions about a horizontal chuck axis passing through the vertical rotative axis; a torch holder so mounted on said structure that it can be moved in a vertical plane with relation to said structure; a cutting torch carried by said torch holder in such a position that the cutting jet from said torch is projected in a substantially horizontal direction toward said rotative axis; a horizontal secondary shaft; a primary crank carried by said secondary shaft having a crank pin; means for so connecting said crank pin to said torch holder that such holder is moved harmonically up and down as said secondary shaft is rotated; means for so connecting said primary and secondary shafts that the secondary shaft moves at twice the angular velocity of the primary shaft; and means for driving one of said shafts.

2. A machine for cutting an end of a nipple in such a manner that the ends so produced will fit closely on the outer surface of a pipe with the axis of the nipple coinciding with the axis of the pipe and at an angle of incidence thereto, which comprises: a supporting structure; a primary shaft so mounted in said structure that it is free to turn about a vertical rotative axis; a chuck so constructed as to hold said nipple firmly with relation to said chuck; means for so mounting said chuck on said primary shaft that the chuck turns with said shaft but can be adjusted and secured in various positions about a horizontal chuck axis passing through the vertical rotative axis; a torch holder so mounted on said structure that it can be moved in a vertical plane with relation to said structure; a cutting torch carried by said torch holder in such a position that the cutting jet from said torch is projected in a substantially horizontal direction toward said rotative axis; a horizontal secondary shaft; a primary crank carried by said secondary shaft having a crank pin; means for so connecting said crank pin to said torch holder that such holder is moved harmonically up and down as said secondary shaft is rotated; means for so connecting said primary and secondary shafts that the secondary shaft moves at twice the angular velocity of the primary shaft; means for maintaining the tip of the cutting torch at an approximately constant distance from the surface of the nipple at all angular positions of the primary shaft, the clutch carried thereby, and the nipple mounted on said clutch; and means for driving one of said shafts.

3. A machine for cutting an end of a nipple in such a manner that the end so produced will fit closely on the outer surface of a pipe with the axis of the nipple coinciding with the axis of the pipe and at an angle of incidence thereto, which comprises: a supporting structure; a primary shaft so mounted in said structure that it is free to turn about a vertical rotative axis; a chuck so constructed as to hold said nipple firmly with relation to said chuck; means for so mounting said chuck on said primary shaft that the chuck turns with said shaft but can be adjusted and secured in various positions about a horizontal chuck axis passing through the vertical rotative axis; a torch holder so mounted on said structure that it can be moved in a vertical plane with relation to said structure; a cutting torch carried by said torch holder in such a position that the cutting jet from said torch is projected in a substantially horizontal direction toward said rotative axis; a horizontal secondary shaft; a primary crank carried by said secondary shaft having a crank pin; means for so connecting said crank pin to said torch holder that such holder is moved harmonically up and down as said secondary shaft is rotated; means for so connecting said primary and secondary shafts that the secondary shaft moves at twice the angular velocity of the primary shaft; a secondary crank mounted on said primary shaft and rotating with said shaft; means connecting the crank pin of said secondary crank to the torch holder so that the tip of the cutting torch is held at an approximately constant distance from the surface of the nipple at all angular positions of the primary shaft, the clutch carried thereby, and the nipple mounted on said clutch; and means for driving one of said shafts.

4. A machine for cutting an end of a nipple in such a manner that the end so produced will fit closely on the outer surface of a pipe with the axis of the nipple coinciding with the axis of the pipe and at an angle of incidence thereto, which comprises: a supporting structure; a primary shaft so mounted in said structure that it is free to turn about a vertical rotative axis; a chuck so constructed as to hold said nipple firmly with relation to said chuck; means for so mounting said chuck on said primary shaft that the chuck turns with said shaft but can be adjusted and secured in various positions about a horizontal chuck axis passing through the vertical rotative axis; a torch holder so mounted on said structure that it can be moved in a vertical plane with relation to said structure; a cutting torch carried by said torch holder in such a position that the cutting jet from said torch is projected in a substantially horizontal direction toward said rotative axis; a horizontal secondary shaft; a primary crank carried by said secondary shaft having a crank pin; means for so connecting said crank pin to said torch holder that such holder is moved harmonically up and down as said secondary shaft is rotated; means for so connecting said primary and secondary shafts that the secondary shaft moves at twice the angular velocity of the primary shaft; a secondary crank mounted on said primary shaft and rotating with said shaft; a cam carried by said torch holder, said cam being engaged by the crank pin of said secondary crank so that the tip of the cutting torch is held at an approximately constant distance from the surface of the nipple at all angular positions of the primary shaft, the clutch carried thereby, and the nipple mounted on said clutch; and means for driving one of said shafts.

5. A machine for cutting an end of a nipple in such a manner that the end so produced will fit closely on the outer surface of a pipe, with the axis of the nipple at an angle other than a right angle to the axis of the pipe, the combination of: a supporting structure; a primary shaft mounted in said structure so that it can turn about a primary axis; a chuck carried by and rotating with said primary shaft, said chuck being adapted to hold said nipple with the axis of said nipple at an angle to said primary axis so that said nipple is carried by said chuck and rotated about said primary axis but not necessarily about the axis of said nipple; a cutting torch so mounted in said supporting structure that it may move in a direction parallel to said primary axis and in a line in a plane to which said primary axis is perpendicular, but is restrained from movement in other directions; means for rotating said primary shaft and the chuck and nipple carried thereby; and means for moving said torch in said direction parallel to said primary axis synchronously with the rotation of said primary shaft and up and down through two cycles for every revolution of the primary shaft so that an end of the desired shape automatically results.

6. A machine for cutting an end of a nipple in such a manner that the end so produced will fit closely on the outer surface of a pipe, with the axis of the nipple at an angle other than a right angle to the axis of the pipe, the combination of: a supporting structure; a primary shaft mounted in said structure so that it can turn about a primary axis; a chuck carried by and rotating with said primary shaft, said chuck being adapted to hold said nipple with the axis of said nipple at an angle to said primary axis so that said nipple is carried by said chuck and rotated about said primary axis but not necessarily about the axis of said nipple; a cutting torch so mounted in said supporting structure that it may move in a direction parallel to said primary axis and in a line in a plane to which said primary axis is perpendicular, but is restrained from movement in other directions; means for rotating said primary shaft and the chuck and nipple carried thereby; means for moving said torch in said direction parallel to said primary axis synchronously with the rotation of said primary shaft and up and down through two cycles for every revolution of the primary shaft so that an end of the desired shape automatically results; and means for moving said torch in said line in said plane in such a manner that throughout the rotation of said primary shaft the tip of said torch is held at such a distance from the nipple that the flame from the torch will properly cut the nipple.

7. A machine for cutting an end of a nipple in such a manner that the ends so produced will fit closely on the outer surface of a pipe, with the axis of the nipple at an angle other than a right angle to the axis of the pipe, the combination of: a supporting structure; a primary shaft mounted in said structure so that it can turn about a primary axis; a chuck carried by and rotating with said primary shaft, said chuck being adapted to hold said nipple with the axis of said nipple at an angle to said primary axis so that said nipple is carried by said chuck and rotated about said primary axis but not necessarily about the axis of said nipple; a cutting torch so mounted in said supporting structure that it may move in a direction parallel to said primary axis and in a line in a plane to which said primary axis is perpendicular, but is restrained from movement in other directions; means for rotating said primary shaft and the chuck and nipple carried thereby; a crank so geared to said primary shaft that it makes two revolutions in synchronism with said primary shaft as said primary shaft makes one revolution; and means for so connecting said crank to said torch that said torch is moved in said line parallel to said axis in synchronism with the movement of said shaft.

8. A machine for cutting an end of a nipple in such a manner that the end so produced will fit closely on the outer surface of a pipe, with the axis of the nipple at an angle other than a right angle to the axis of the pipe, the combination of: a supporting structure; a primary shaft mounted in said structure so that it can turn about a primary axis; a chuck carried by and rotating with said primary shaft, said chuck being adapted to hold said nipple with the axis of said nipple at an angle to said primary axis so that said nipple is carried by said chuck and rotated about said primary axis but not necessarily about the axis of said nipple; a cutting torch so mounted in said supporting structure that it may move in a direction parallel to said primary axis and in a line in a plane to which said primary axis is perpendicular, but is restrained from movement in other directions; means for rotating said primary shaft and the chuck and nipple carried thereby; a crank so geared to said primary shaft that it makes two revolutions in synchronism with said primary shaft as said primary shaft makes one revolution; means for so connecting said crank to said torch that said torch is moved in said line parallel to said axis in synchronism with the movement of said shaft; and means for moving said torch in said line in said plane in such a manner that throughout the rotation of said primary shaft the tip of said torch is held at such a distance from the nipple that the flame from the torch will properly cut the nipple.

9. A machine for cutting an end of a nipple in such a manner that the end so produced will fit closely on the outer surface of a pipe, with the axis of the nipple at an angle other than a right angle to the axis of the pipe, the combination of: a supporting structure; a primary shaft mounted in said structure so that it can turn about a primary axis; a chuck carried by and rotating with said primary shaft, said chuck being adapted to hold said nipple with the axis of said nipple at an angle to said primary axis so that said nipple is carried by said chuck and rotated about said primary axis but not necessarily about the axis of said nipple; a cutting torch so mounted in said supporting structure that it may move in a direction parallel to said primary axis and in a line in a plane to which said primary axis is perpendicular, but is restrained from movement in other directions; means for rotating said primary shaft and the chuck and nipple carried thereby; a crank so geared to said primary shaft that it makes two revolutions in synchronism with said primary shaft as said primary shaft makes one revolution; means for so connecting said crank to said torch that said torch is moved in said line parallel to said axis in synchronism with the movement of said shaft; and a cam and roller so actuated by said primary shaft that said torch is moved in said line in said plane in such a manner that throughout the rotation of said primary shaft the tip of said torch is held at such a distance from the nipple that the flame from the torch will properly cut the nipple.

EDWIN S. CHRISTENSEN.

REFERENCES CITED

The following references are of record in the file of this patent:

UNITED STATES PATENTS

| Number | Name | Date |
| --- | --- | --- |
| 831,078 | Jottrand | Sept. 18, 1906 |
| 1,985,080 | Crowe | Dec. 18, 1934 |
| 1,966,403 | Durham | July 10, 1934 |
| 2,015,246 | Taylor | Sept. 24, 1935 |
| 2,334,301 | Young | Nov. 16, 1943 |
| 1,661,274 | Steere et al. | Mar. 6, 1928 |
| 1,954,549 | Twigg et al. | Apr. 10, 1934 |
| 1,963,537 | Tweit | June 19, 1934 |
| 2,057,612 | Formont | Oct. 13, 1936 |

FOREIGN PATENTS

| Number | Country | Date |
| --- | --- | --- |
| 412,788 | Germany | Apr. 27, 1925 |
| 681,494 | Germany | Sept. 23, 1939 |

Certificate of Correction

Patent No. 2,422,338.

June 17, 1947.

EDWIN S. CHRISTENSEN

It is hereby certified that errors appear in the printed specification of the above numbered patent requiring correction as follows: Column 2, line 39, for that portion of the equation reading "x=y" read $z=y$; column 4, line 12, for "pipe 29" read *pin 29*; and that the said Letters Patent should be read with these corrections therein that the same may conform to the record of the case in the Patent Office.

Signed and sealed this 19th day of August, A. D. 1947.

[SEAL]

LESLIE FRAZER,
*First Assistant Commissioner of Patents.*